(12) United States Patent
Cogill et al.

(10) Patent No.: US 9,598,050 B2
(45) Date of Patent: Mar. 21, 2017

(54) VEHICLE AND LOCAL AREA SECURITY SYSTEM COMMUNICATIONS

(71) Applicant: International Business Machines Corporation, Armonk, NY (US)

(72) Inventors: Randall Lee Cogill, Dublin (IE); Olivier Gallay, Zurich (CH); Chungmok Lee, Kyunggi-do (KR); Zubair Nabi, Dublin (IE); Martin M. Rufli, Winterthur (CH); Robert Shorten, Dublin (IE); Tigran T. Tchrakian, Dublin (IE); Rudi Verago, Dublin (IE); Fabian Roger Wirth, Bremen (DE); Sergiy Zhuk, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/747,427

(22) Filed: Jun. 23, 2015

(65) Prior Publication Data
US 2016/0318482 A1 Nov. 3, 2016

Related U.S. Application Data

(63) Continuation of application No. 14/698,941, filed on Apr. 29, 2015.

(51) Int. Cl.
*B60R 25/10* (2013.01)
*B60R 25/30* (2013.01)
(Continued)

(52) U.S. Cl.
CPC ............ *B60R 25/30* (2013.01); *B60R 25/102* (2013.01); *B60R 25/33* (2013.01)

(58) Field of Classification Search
CPC combination set(s) only.
See application file for complete search history.

(56) References Cited

U.S. PATENT DOCUMENTS

| 4,833,449 A | 5/1989 | Gaffigan |
|---|---|---|
| 5,027,104 A | 6/1991 | Reid |

(Continued)

FOREIGN PATENT DOCUMENTS

WO 2012119253 9/2012

OTHER PUBLICATIONS

Wu, B., et al., "A Practical Home Security System via Mobile Phones," Proceedings of the 5th WSEAS International Conference on Telecommunications and Informatics, May 27-29, 2006, pp. 299-304.

(Continued)

*Primary Examiner* — Travis Hunnings
(74) *Attorney, Agent, or Firm* — Fleit Gibbons Gutman Bongini Bianco PL; Jon A. Gibbons

(57) ABSTRACT

A local area security system interfaces with one or more vehicles to provide enhanced security. The vehicles have vehicle sensors which may further help determine a presence of potential threat within a vicinity of the local area security system. The multiple vehicle network may communicate with each other to expand the vicinity of the local area security system, share equipment, computing resources, and information in the determination of the presence of the potential threat. The battery powered vehicle may employ various methods to conserve battery power while coupled to the local area security system.

15 Claims, 6 Drawing Sheets

(51) Int. Cl.
    *B60R 25/102*     (2013.01)
    *B60R 25/33*     (2013.01)

(56) References Cited

U.S. PATENT DOCUMENTS

| | | |
|---|---|---|
| 5,463,595 A | 10/1995 | Rodhall et al. |
| 6,029,183 A | 2/2000 | Jenkins et al. |
| 6,661,340 B1 | 12/2003 | Saylor et al. |
| 6,711,687 B1 | 3/2004 | Sekiguchi |
| 6,756,896 B2 | 6/2004 | Ford |
| 7,081,813 B2 * | 7/2006 | Winick ............... B60R 25/1004 340/426.1 |
| 2003/0158635 A1 | 8/2003 | Pillar et al. |
| 2005/0128068 A1 * | 6/2005 | Winick ............... B60R 25/1004 340/517 |
| 2007/0279209 A1 | 12/2007 | Kogan et al. |

OTHER PUBLICATIONS

Van Den Dam, R., "Internet of Things: The Foundational Infrastructure for a Smarter Planet," Lecture Notes in Computer Science, Aug. 2013, pp. 1-12.

Koopman, P., "Embedded System Security," Embedded Computing, Jul. 2004, pp. 1-3.

\* cited by examiner

VEHICLE AND LOCAL AREA SECURITY SYSTEM COMMUNICATIONS

BACKGROUND

This application is based upon and claims priority from prior U.S. patent application Ser. No. 14/698,941, filed on Apr. 29, 2015, the entire disclosure of which is herein incorporated by reference in its entirety.

The present disclosure generally relates to communications between one or more vehicles and a local area security system.

Local area security systems, such as home security systems, office security systems, building security systems and retail mall security systems use computers to monitor sensors to determine a potential threat within the vicinity of the local area security system. Multiple sensors enhance an ability to of the local area security system to determine the potential threat. Vehicles enter and leave the vicinity of a local area security system. Vehicles include sensors that are monitored by a vehicle computer to implement a function of the vehicle and may be idle while the vehicle is parked within the vicinity of the local area security system.

BRIEF SUMMARY

In one example, a vehicle has a computer system implementing a function of the vehicle when the vehicle is located beyond a vicinity of a local area security system. The function may be based upon a sensor signal from a vehicle sensor sensing a condition exterior to the vehicle. A method in the vehicle comprises determining the vehicle location to be within the vicinity of the local area security system and communicating a sensor information signal based upon the sensor signal to the local area security system.

In another example, a local area security system comprises a local sensor sensing a condition within a vicinity of the local area security system, an interface for communicating with a vehicle having a computer system implementing a function of the vehicle when the vehicle is located beyond the vicinity of the local area security system. The function of the vehicle may be based upon a sensor signal from a vehicle sensor sensing a condition exterior to the vehicle. The interface for receiving a sensor information signal may be based upon the sensor signal. The sensor information signal received from the vehicle while the vehicle is within the vicinity of the local area security system, and a processor determining a presence of a potential threat within the vicinity of the local area security system may be based upon the sensor information signal.

In another example, a computer programming product for controlling an operation of a vehicle having a computer system for implementing a function of the vehicle when the vehicle is located beyond a vicinity of a local area security system is disclosed. The function of the vehicle is based upon a sensor signal from a vehicle sensor sensing a condition exterior to the vehicle. A method for controlling the operation comprises a tangible non-transitory computer-readable storage medium and a computer program instructions for determining the vehicle location to be within the vicinity of the local area security system, and communicating a sensor information signal based upon the sensor signal to the local area security system.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

In the following discussion, details are provided to help thoroughly understand the present disclosure. However, it is apparent to those of ordinary skill in the art that even though there may be no such details, the understanding of the present disclosure would not be influenced. In addition, it should be further appreciated that any specific terms or applications used herein are only for the convenience of description, and thus the present disclosure should not be limited to only use in any specific terms or applications represented and/or implied by such terms.

Figure 1:
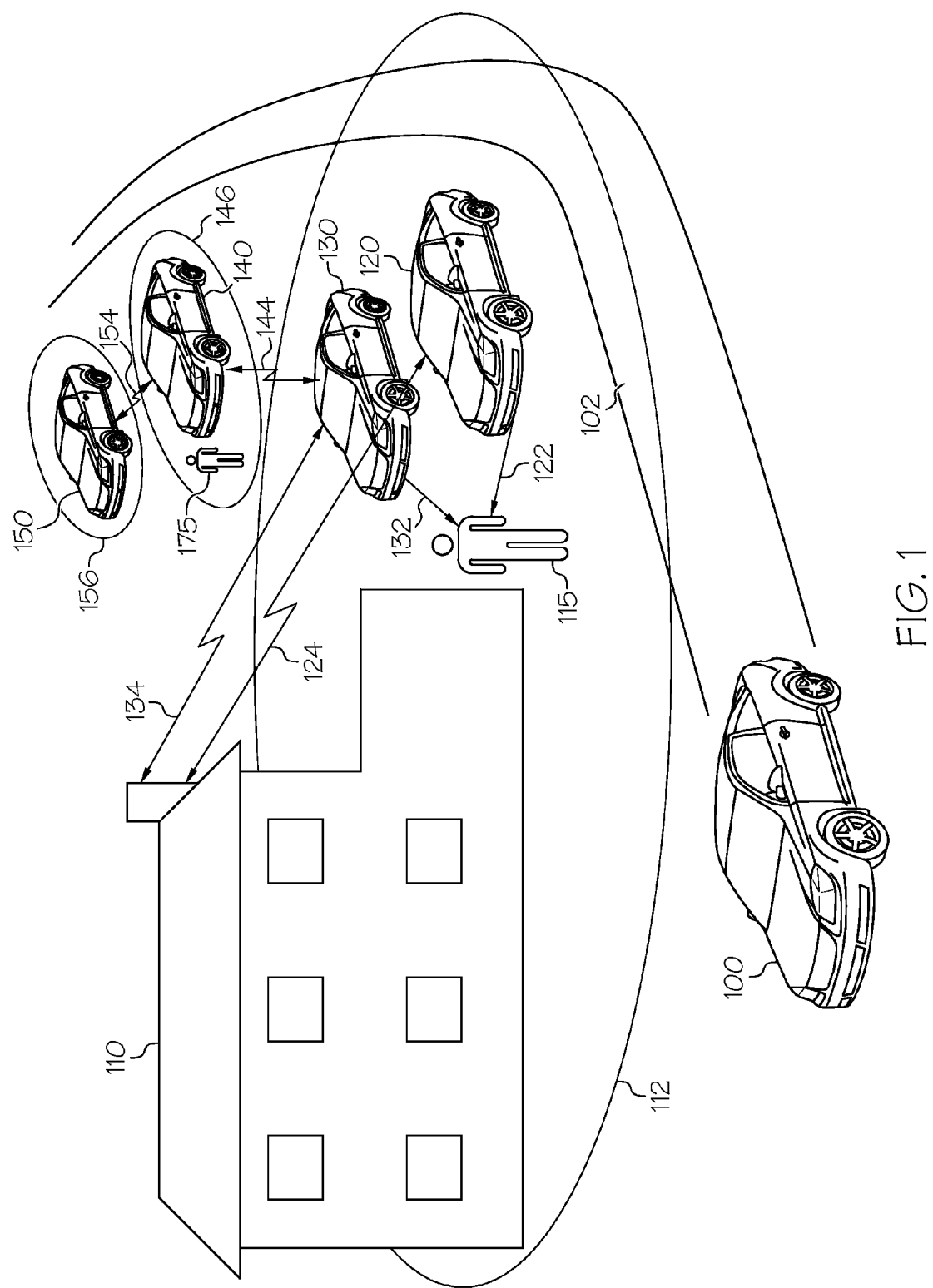
FIG. 1 represents an illustrative diagram of elements of the description.

FIG. 1 represents an illustrative diagram of elements of the description. A vehicle 100, such as automobile or truck, traveling on a road 102 has one or more vehicle sensors for implementing one or more functions of the vehicle. Vehicle sensors may be heterogeneous and may be of any type while remaining within the scope of this description. Examples of vehicle sensors may include acoustic receivers, acoustic transceivers, infrared sensors, infrared transceivers, temperature sensors, humidity sensors, precipitation detectors, smoke sensors, magnetometers, accelerometers, gyroscopic sensors, proximity sensors, radio receivers, radio transceivers, RADAR, LiDAR, LaDAR, ambient light detectors, location detectors, video cameras and other systems known to those familiar with the art. These sensors may be used alone or in combination to implement one or more functions of the vehicle. Such functions include vehicle navigation, atmospheric compensation such as cabin heating or air conditioning, driver assistance systems, lane detection, video recording, collision detection, windshield wiper operation, headlight operation, vehicle location, object and motion detection, vehicle communication systems, vehicle security systems and other functions known to those familiar with the art of vehicles. While the vehicle sensors tend to enhance the functionality of the vehicle while traveling, the vehicle sensors may remain substantially unutilized while the vehicle is not being operated by a driver, such as when a car is parked at a driver's home or office or at a shopping area.

A building 110 may be a property such as home or office or shopping area or other area where a local area security system is desirable. Such security systems detect potential threats within a vicinity 112 of the local area security system. Such potential threats include a person 115 approaching the premises or other activities that merit attention. Typically an alarm is generated in response to a detected potential threat to draw attention to the potential threat. Local area security systems may use one or more local sensors to detect the potential threat. Such sensors include video cameras, acoustic receivers, acoustic transceivers, magnetic sensors, temperature sensors, electromagnetic receivers and transceivers, and other sensors known to those familiar with the art. The local sensors are used by the local area security system to facilitate the determination of a presence of a potential threat by implementing functions such as motion detection, glass break detection, door and window detection and other detections known by those familiar with the art of local area security systems.

Some security systems may lack sufficient sensors and sufficient sensor analysis and processing power to accurately determine a presence or absence of a potential treat. There may be insufficient sensors to generate sensor signals to enable accurate detection of a potential threat. For example, an unknown person may approach a house on a path where there are no sensors able to detect the presence of the person, thus an alarm of the potential threat is not generated. Alternately, a sensor signal may be generated based on detection of an event, the sensor signal generated in such a way that a person is improperly identified as a potential threat. Reasons for this improper identification include either because there is insufficient information in the sensor signal to identify the event as a non-threat or because the local area security system lacks sufficient processing power to determine the event as a non-threat. For example, an owner of a house approaching the house may be sensed by a sensor and then inappropriately determined to be a potential threat, and an alarm falsely generated. Since vehicles parked in the vicinity of a local area security system generally have available sensors and processing power whose capabilities and range might exceed those of the existing local area security system, a potential advantage may be realized when the local area security system functionality includes the additional sensors and processing abilities of such vehicles while in the vicinity of the local area security system.

In one example a vehicle 120 is parked within the vicinity 112 of a house 110 having a local area security system. Because of the placement of local sensors around the house, a person 115 approaching the house is not detected. However, the vehicle sensors may include ultrasonic transducers which form proximity sensors 122 in the vehicle 120 that may detect the presence of person 115 and communicate the detection to the local area security system. The communication may be through a wireless link 124 such as a Bluetooth, WiFi, ZigBee, cellular, or other wireless interfaces. Alternately, the interface may be a wired Ethernet or other interface, particularly if vehicle 120 was coupled to a battery charging station coupled to the power system of the house for example. The vehicle may include the proximity sensor signal in a sensor information signal communicated to the local area security system in order that the local area security system further process the signal to determine the presence of a potential threat. In an alternate example, the vehicle may process the sensor signal and make its own potential threat determination and include the determination in the sensor information signal communicated to the local area security system. Multiple sensors may be analyzed in the determination. For example, one vehicle proximity sensor may detect objects close to the ground and another may detect objects above the ground. While the vehicle is parked, if an object is not detected by both proximity sensors, then it is likely a small animal and thus not a potential threat. Such a determination analyzing multiple sensor signals may be made utilizing the processing power of the vehicle or the processing power of the local area security system or distributed between the vehicle and the local area security system based upon a number of considerations in a manner known to those familiar with the art.

Vehicle 130 may also be located within vicinity 112 and also have proximity detectors 132 detecting person 115 for communication to the local area security system through wireless link 134. However, person 115 may be the driver of vehicle 130 and have activated a key fob locking vehicle 130, the vehicle sensor receiving the key fob signal may utilized an electromagnetic radio frequency receiver as the vehicle sensor. With sufficient processing of from sensor information signals from vehicles 120 and 130, person 115 could be detected as a person and then affirmatively determined to be a non-threat within the vicinity based upon the key fob sensor. Proximity sensors from both vehicles would detect a person within the vicinity which may represent a potential threat, however sensor information from the key fob sensor may affirmatively be used to determine that person 115 is a non-threat. This determination may be made by local area security system receiving sensor information signals including live signals from the various sensors of vehicles 120 and 130. Alternately, vehicle 130 may process signals from its proximity and key fob sensors to determine person 115 to be a non-threat and communicate the determination in the sensor information signal to local area security system. In such a case, proximity sensors of vehicle 120 also detect person 115 which may not provide sufficient information to determine per person 115 to be a non-threat. Nevertheless, the determination may be made by the local area security system based upon the sensor information signal received from vehicle 130. Such a determination may be enhanced by an authentication process that only allows authorized communications. Furthermore, information from location sensors and orientation sensors such as magnetometers may be used to accurately locate detected objects to determine if the object location determined by one vehicle corresponds to the object location determined by another vehicle or stationary sensors of the local area security system.

In an alternate example, the processing power of the local area security system may be offloaded or distributed, and the determination that the signal received by proximity sensors of vehicle 120 are processed to determine person 115 is a non-threat by the processor of vehicle 120. In such an example, the sensor information signal is communicated from vehicle 130 to 120, either by a direct vehicle to vehicle communication or through a relay such as the local area security system or another vehicle. With the sensor information signal from vehicle 130, vehicle 120 could process the information from the key fob sensor of vehicle 120 to determine person 115 is a non-threat. If the sensor information signal from vehicle 130 also included a determination of the location of the object by the proximity sensors of vehicle 130, then the object location determination by vehicle 120 could be used to further substantiate the non-threat determination. Furthermore, authentication of the communications between the vehicles would further substantiate the determination.

Vehicles 120 and 130 are shown parked within the vicinity 112 of the local area security system. In another example, vehicle 140 is shown coupled to vehicle 130 through wireless link 144. Vehicle 140 has sensors able to detect a potential threat with a vicinity 146. The vicinity 146 may be added to vicinity 112 to expand the vicinity of the local area security system. Further, vehicle 150 is shown coupled to vehicle 140 through wireless link 154. Vehicle 150 has sensors able to detect a potential threat within a vicinity 146. Thus, both the vicinity 136 and 146 may be added to vicinity 112 to expand the vicinity of the local area security system. As an example of the expanded vicinity, person 175 may be detected approaching house 110 well before entering the vicinity 112 because the person would be detected in vicinity 156 by vehicle 150 and then in vicinity 146 by vehicle 140. The sensor information signals from vehicles 140 and 150 may be relayed through vehicle 130 and to the local area security system.

Vehicles 120, 130, 140 and 150 are networked and form a network of vehicles which may be battery powered. Thus, it may be advantageous to conserve battery power and reduce power consumption while the vehicles are parked. Any approach for reducing battery power consumption in response to a vehicle coupling to a security system coupled to a vehicle is contemplated to be within the scope of this description. Reduction of battery power consumption may be accomplished by reducing the amount of communications between the vehicles and/or reducing the powering of sensors. In one example, communication transmissions may be reduced by communicating determinations of threats by vehicles in the sensor information signal, rather than continuous live sensor signals, thereby conserving power in the communication of the sensor information signal. Thus a communication may be reduced to communication were a sensor information signal included a determination of a potential threat. In another example, the proximity sensors of vehicles 120 and 130 may be determined to be substantially redundant based upon their location and sensing abilities, in which case proximity sensors from one of the vehicle may be turned off, thereby conserving battery power for that vehicle.

In another example of battery power conservation, sensors may be periodically strobed or enabled to conserve battery power. Strobing or periodically enabling a sensor at a rate of once a second may be sufficient to determine a threat while conserving battery power. If proximity sensors of vehicles 120 and 130 were determined to detect objects within a common area, then each could be strobed or enabled at a rate of once every two seconds and phased a second apart to provide adequate object detection while further conserving power in both vehicles. However, if an object was detected by the proximity sensors of one of the vehicles, say vehicle 130, then for the duration of the detection of the object, the proximity sensors of vehicle 130 may remain on. Furthermore, based upon the sensor information signal from vehicle 130, the proximity sensors of vehicle 120 may be powered on more frequently or constantly in order to provide more sensor information to more accurately determine the presence or absence of the potential threat.

Similarly, if person 175 was detected by strobed proximity sensors in vehicle 150 as person 175 approached house 110, then vehicle 140 could reduce the strobe rate of its sensors or continuously operate its sensors based upon the sensor information signal received from vehicle 150. In this example, this would allow the generation of additional sensor information to more accurately determine the potential threat of person 175 while approaching house 110. The determination could be made by the local area security system processing sensor information from the sensors of the various signals, or the determination could be distributed through the various vehicles processing sensor information from their respective sensors, or from sensors of other vehicles or local sensors of the local security system. In these examples, vehicle battery power may be conserved in the absence of a potential threat, while significant sensor information made available for processing in the presence of a potential threat.

Figure 2:
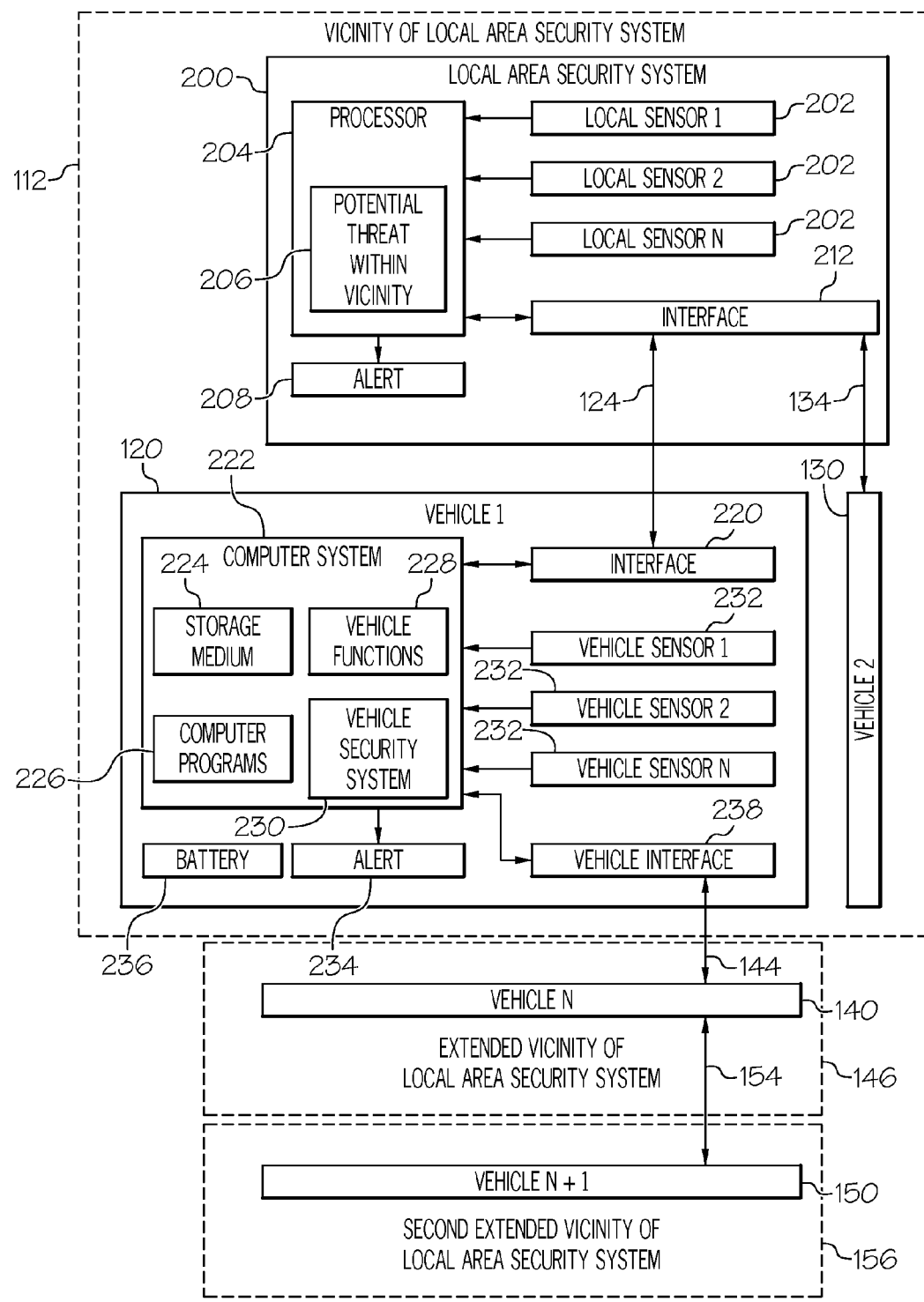
FIG. 2 illustrates an exemplary block diagram for vehicle and local area security system communications.

FIG. 2 illustrates an exemplary block diagram for vehicle and local area security system communications. Local area security system 200 includes one or more local sensors 202 for sensing one or more conditions within vicinity 112. Local sensors may include any sensors known to those familiar with the art including the aforementioned local sensors. Processor 204 is coupled to the local sensors in order to operate a process 206 that determines the presence or absence of a potential threat within the vicinity. In response to a determined potential threat, an alert 208 is generated which may be an alarm, light flash, notice to a security or police force or other alert known to those familiar with the art. Interface 212 provides for an interface with vehicles 120, 130 and reception of sensor information signals from the various vehicles. The interface may provide for wired or wireless interfaces with the vehicles such as those interfaces known to those familiar with the art.

Vehicle 120 includes a corresponding interface 220 for communicating its sensor information signal to the local area security system 200 via interface 212. Vehicle 120 includes a computer system 222 having a computer readable storage media which may be non-transitory and removable, and computer program instructions 226 for implementing methods for controlling the operations and functions 228 of the vehicle. The computer instructions may be stored on storage media 224. The vehicle also includes one or more vehicle sensors 232, such as sensor 122, producing corresponding vehicle sensor signals. Vehicle sensors 232 may include any sensors known to those familiar with the art including the aforementioned vehicle sensors. Many of the vehicle functions 228 may be implemented while the vehicle is beyond the vicinity 122 of the local area security system and may include any vehicle functions known to those familiar with the art, including the aforementioned vehicle functions. The vehicle security system 230 monitors various sensors 232 to determine a potential threat to the vehicle whether or not the vehicle is within the vicinity 122 of the local area security system and then alert 234 the determination. The generation of the sensor information signal may be independent of the determination of a presence or absence of a potential threat to the vehicle by vehicle security system 230. For example, detection of person 115 by vehicle 120 may be determined to be far enough away from the vehicle to not be a potential vehicle threat but may be determined to be a potential threat within the vicinity of the local area security system. Similarly, an under inflated tire on vehicle 120 may be determined to be a potential vehicle threat, but not a threat to the local area security system.

Vehicle 120 also includes a battery 236 for implementing various functions of the vehicle including operation of the vehicle sensors and generation of the sensor information signal. Conservation of battery power using approaches as described herein may be advantageous when the vehicle is in communication with the local area security system.

Vehicle 120 also includes a vehicle interface 238 for interfacing to other vehicles. Vehicle 120 is shown interfacing 144 to vehicle 140 through interface 238. As described with respect to FIG. 1, vehicle 140 wirelessly interfaces 154 with vehicle 150. An advantage of this vehicle to vehicle interfacing may include expanding the size of the vicinity 112 to include vicinities 146 and 156 as well as the communication of sensor information signals between vehicles and the distribution of the process for determining the presence or absence of a potential threat between the vehicles.

Figure 3:
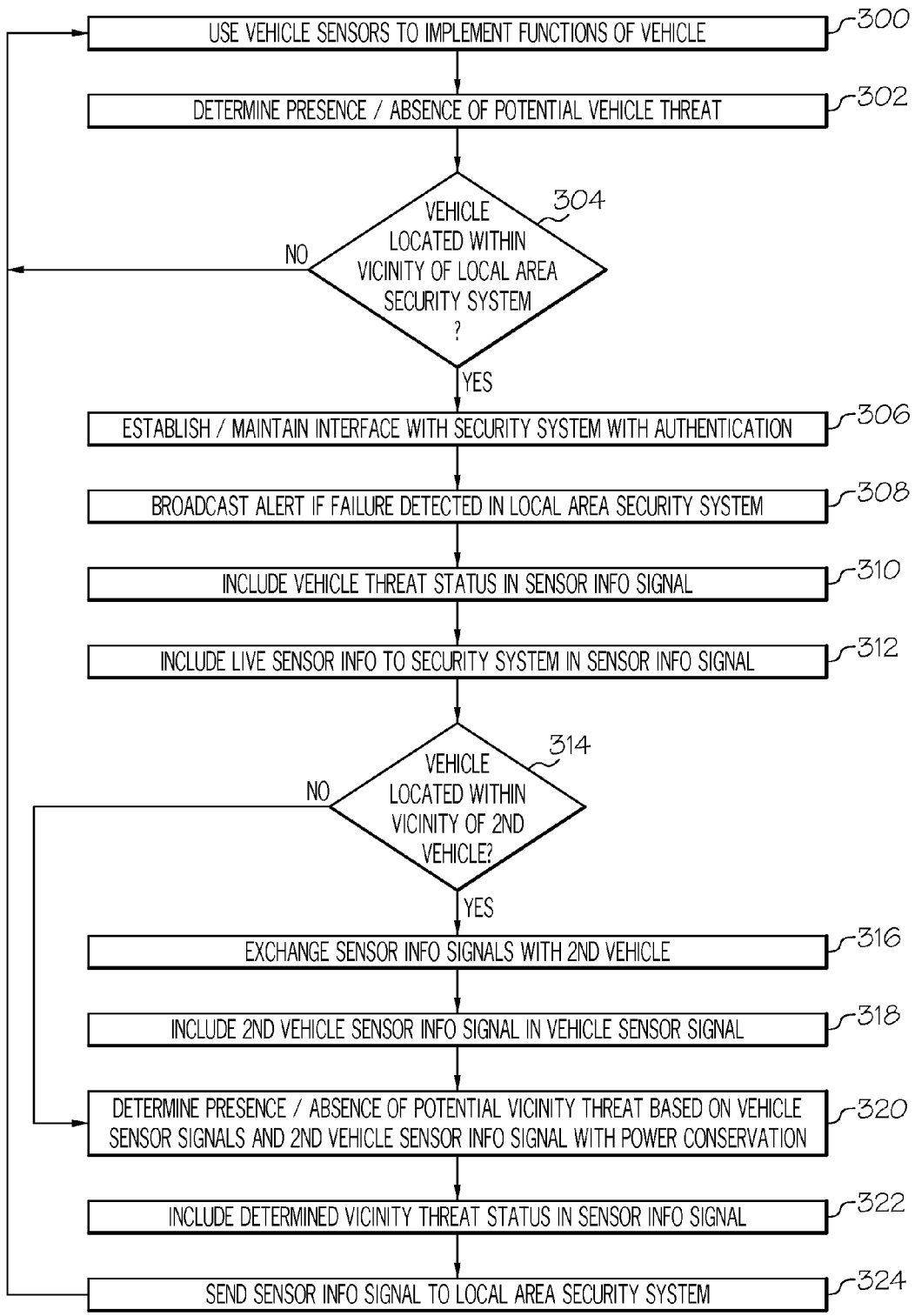
FIG. 3 illustrates an exemplary flow diagram for vehicle and local area security system communications.

FIG. 3 illustrates an exemplary flow diagram for vehicle and local area security system communications. In step 300 the vehicle sensors are used to implement the various functions of the vehicle. In step 302 the presence or absence of a vehicle threat is determined based at least on part on the processing of the vehicle sensors signals, and an alert may be generated. Step 304 determines if the vehicle is in the vicinity of the local area security system. Differing approaches may be utilized to make this determination while remaining within the scope of this description, including location determination using GPS or other location determination method as well as an ability to establish a wired or wireless coupling to interface of the local area security system. The process returns to step 300 if the vehicle is not within the vicinity, which corresponds to conventional vehicle operations. It should be noted that the process allows for the conventional vehicle processes of step 300 and 302 whether or not the vehicle is within the vicinity of the local area security system.

If within the vicinity of the local area security system, step 306 establishes a new interface (or maintains an existing interface) with the local area security system. The interface may include authentication. Any type of authentication, encryption and/or communication security may be used while remaining within the scope of this description.

Step 308 determines if a failure of the local area security system has occurred and broadcasts a defect signal based upon the failure. A failure or neutralization of the system may include an inability or reduced capacity to interface with the system while in the vicinity of the local area security system. For example, if an unauthorized removal of power from the local area security system has occurred or the local area security system is otherwise disabled, and the vehicle arrives in the vicinity of the local area security system (as determined by GPS for example) then the inability of the vehicle to establish an interface with the local area security system would be indicative of a failure. In response the vehicle could broadcast a defect signal. Another example of a failure resulting in reduced capacity may include a disabling of a communication link between the local area security system and external security service, such as by severing a telephone line. Accordingly, the vehicle would broadcast a defect signal. A defect signal may be any defect signal known to those familiar with the art, including for example, a sounding of an audio alert via a horn of a vehicle, or the vehicle broadcasting the defect signal to a security service via a cell phone network using a modem in the vehicle or a driver's cellphone wirelessly coupled to the vehicle's computer system.

Optional step 310 includes the vehicle threat signal determined at step 302 in the sensor information signal. Optional step 312 includes a live signal representation of the sensor signals of the vehicle within the sensor information signal. For example, if the vehicle sensor was a video camera, then the live signal representation would appear as a live video feed from the video camera of the vehicle. The live signal representation may be analyzed by the local area security system (or distributed to any networked vehicle) using any process while remaining within the scope of this description. For example, a live video feed may be processed for motion detection, object location, object recognition or facial recognition as part of a determination of a potential threat.

Step 314 determines if the vehicle is located within the vicinity of a second vehicle. If so, step 316 exchanges sensor information signals with the second vehicle. The exchange may be used for a number of purposes, including to relay information to the local area security system or other networked vehicles, facilitate distribution of processes for determining the presence of absence of potential threats, or facilitate battery conservation between the vehicles. In step 318 the second vehicle's sensor information signal may be included in the vehicle sensor information signal.

Step 320 determines the presence of absence or a potential vicinity threat based on vehicle sensor signals as well as the second vehicle sensor information signal. The following figures provide a more detailed description of step 320. Step 322 includes the determination of the presence or absence of the potential vicinity threat that is included in the sensor information signal which is sent to the local area security system at step 324. Thereafter the process returns to step 300.

Figure 4:
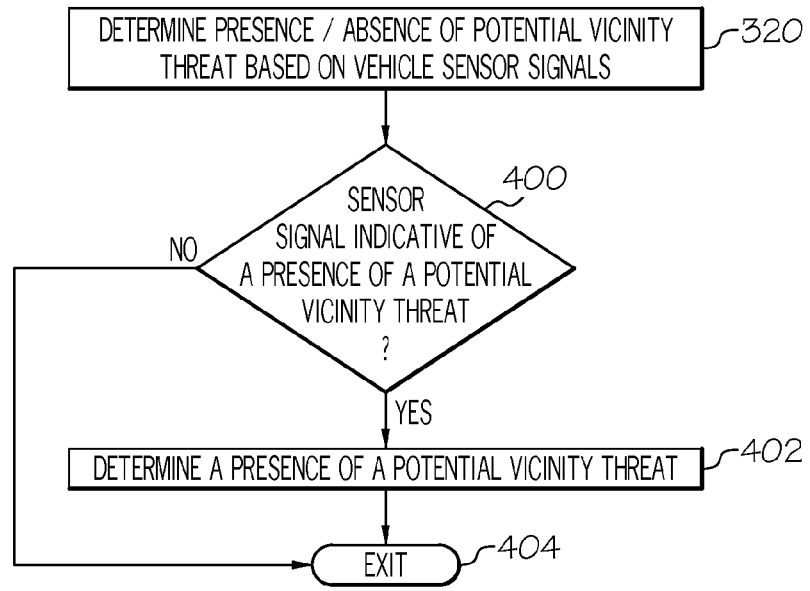
FIG. 4 illustrates a first exemplary flow diagram for determining a presence or absence of a potential vicinity threat.

FIG. 4 illustrates a first exemplary flow diagram for determining a presence or absence of a potential vicinity threat. Entering at step 320 of FIG. 3, step 400 determines if a sensor signal is indicative of a presence of a potential vicinity threat. For example a proximity sensor may detect a moving object. In response, step 402 determines that a potential vicinity threat is present and exits to the flow diagram of FIG. 3 at step 404.

Figure 5:
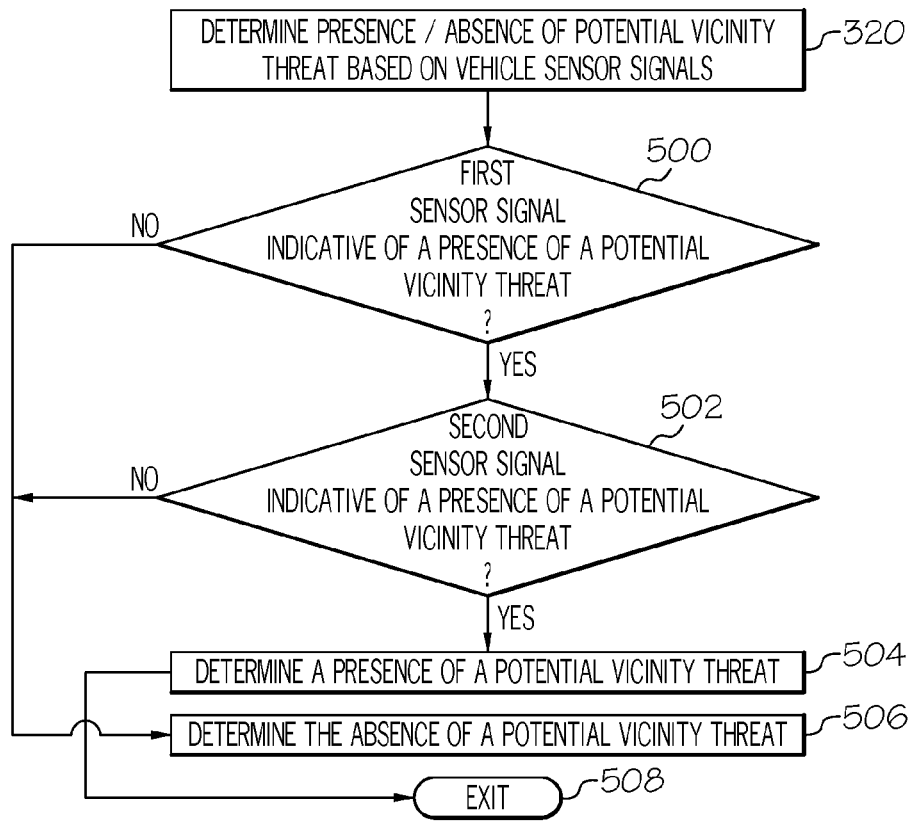
FIG. 5 illustrates a second exemplary flow diagram for determining a presence or absence of a potential vicinity threat.

FIG. 5 illustrates a second exemplary flow diagram for determining a presence or absence of a potential vicinity threat. Entering at step 320 of FIG. 3, step 500 determines if a first sensor signal is indicative of a presence of a potential vicinity threat. If so, step 502 determines if a second sensor signal from the vehicle is also indicative of the potential vehicle threat. Then step 504 determines the presence of the potential vicinity threat based upon signals from the two sensors of the vehicle, and then exits back to the flow diagram of FIG. 3 at step 508. The flow diagram of FIG. 5 may be modified to include any number of sensors from the vehicle in the threat determination. Building on a prior example with respect to detection of person 115 by vehicle 130, upper and lower proximity sensors of a vehicle may detect an object, but a sensor signal from a third key fob sensor of the vehicle may indicate the object detected by the two proximity sensors may not be a threat. Consequently the absence of a threat would be determined at step 506 and the process would exit back to the process of FIG. 3 at step 508.

Figure 6:
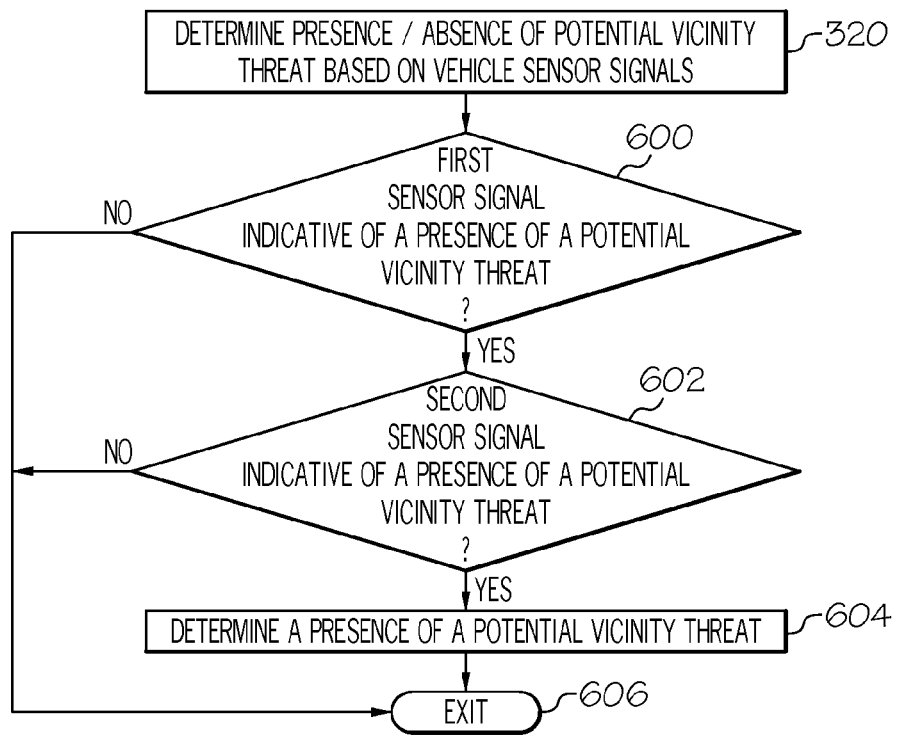
FIG. 6 illustrates a third exemplary flow diagram for determining a presence or absence of a potential vicinity threat.

FIG. 6 illustrates a third exemplary flow diagram for determining a presence or absence of a potential vicinity threat. Entering at step 320 of FIG. 3, step 600 determines if a first sensor signal is indicative of a presence of a potential vicinity threat. If so, step 602 determines if a second sensor signal from a vehicle sensor of a second vehicle is also indicative of the potential vehicle threat. Then step 604 determines the presence of the potential vicinity threat based upon signals from two sensors of the vehicle, and then exits back to the flow diagram of FIG. 3 at step 506. The flow diagram of FIG. 6 may be modified to include any number of sensors from any number of vehicles in the threat determination. Building on a prior example object detection by proximity sensors of both vehicles 120 and 130 may be required to detect an object since it may be determined that those proximity detectors redundantly cover a common area. In another example, a proximity detector of one vehicle may detect person 175, while a video camera on another vehicle performing biometric recognition on the detected person may recognize a human but not identify the human as an authorized person, thereby resulting in a determination of a potential threat at step 604.

Figure 7:
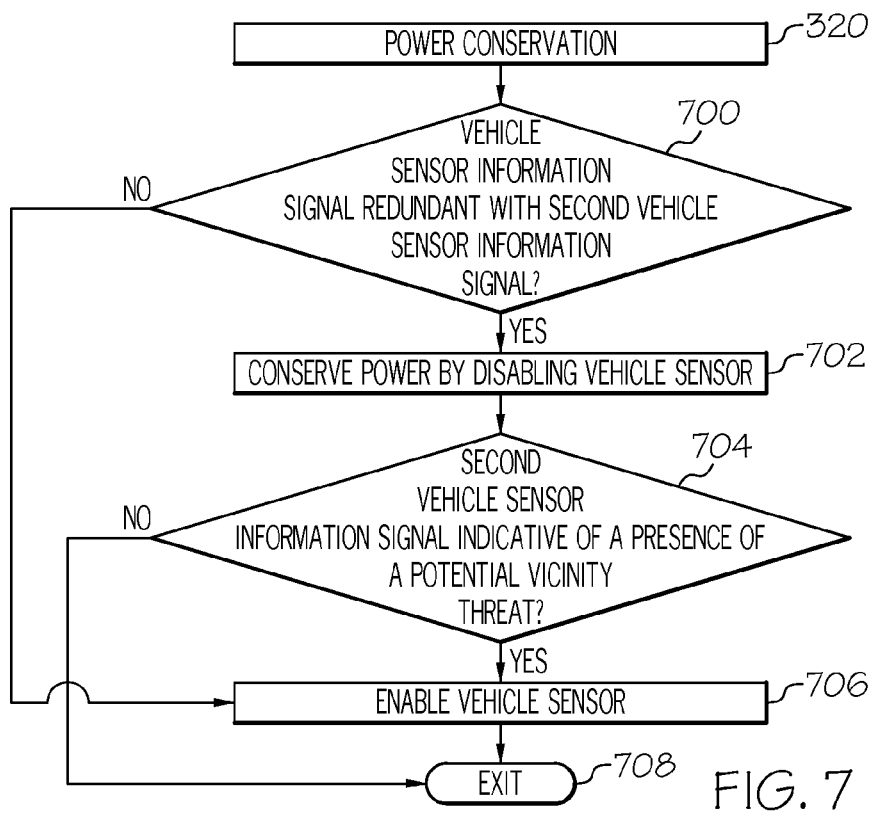
FIG. 7 illustrates a first exemplary flow diagram for conserving power.

FIG. 7 illustrates a first exemplary flow diagram for conserving power. Entering at step 320 of FIG. 3, step 700 determines if the vehicle sensor information signal is redundant with a vehicle information signal of a second vehicle. If not, then the vehicle sensor is enabled at step 706 and the flow diagram exits back to FIG. 3 at step 708. If so, then step 702 conserves power by disabling the vehicle sensor. Then if the sensor information signal from the second vehicle indicate a presence of a potential vehicle threat at step 704, then the vehicle sensor disabled at step 702 is enabled at step 706 and the flow diagram exits back to FIG. 3 at step 708. Building on a prior example if the proximity sensors of vehicles 120 and 130 were determined to be redundant then one of the vehicle sensors would be shut down to conserve power. If a potential threat were detected, then power would be restored to the shutdown sensor to better facilitate a determination of a potential vicinity threat.

Figure 8:
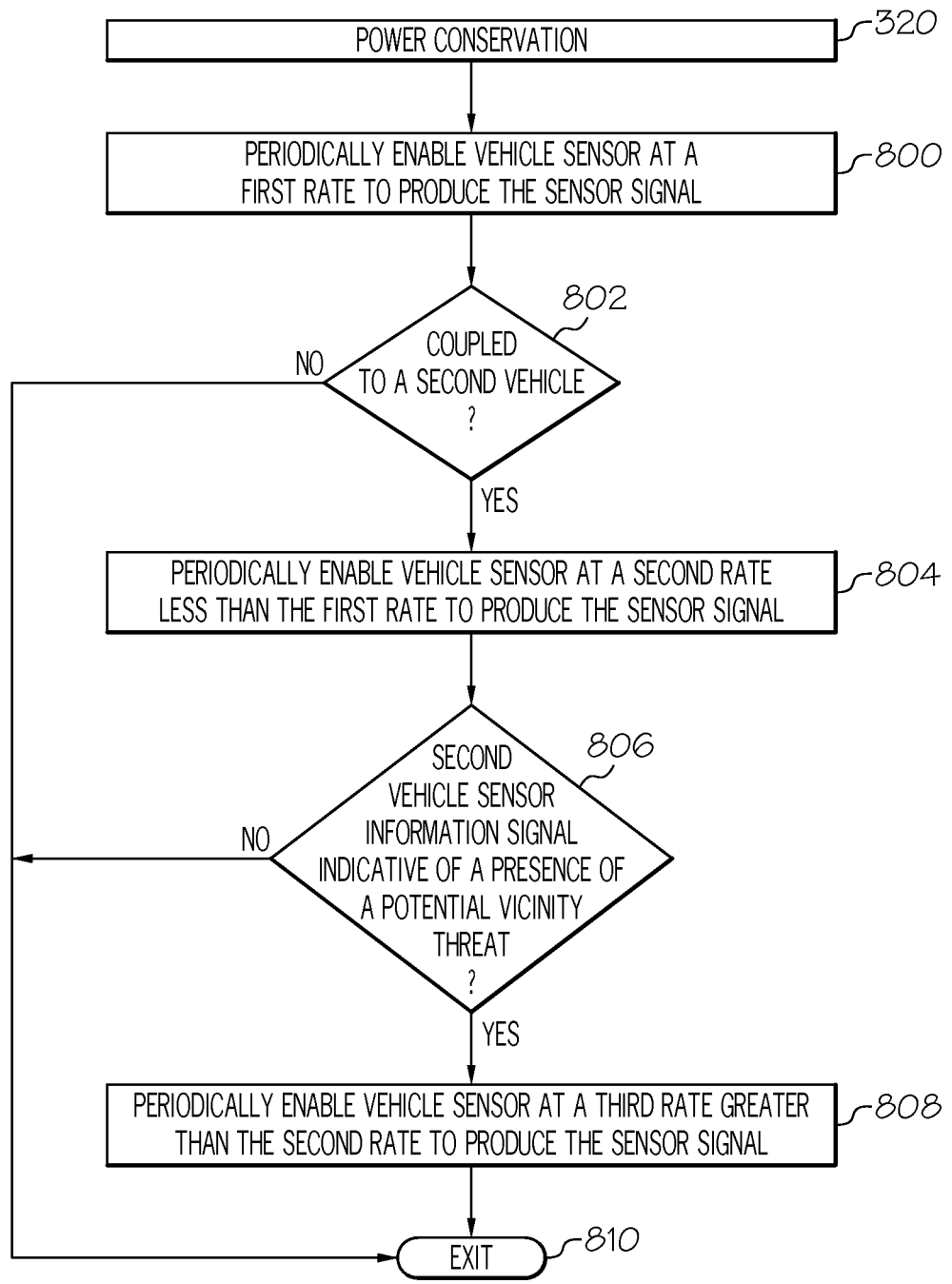
FIG. 8 illustrates a second exemplary flow diagram for conserving power.

FIG. 8 illustrates a second exemplary flow diagram for conserving power. Entering at step 320 of FIG. 3, step 800 periodically enables a vehicle sensor at a first periodic rate to produce the sensor signal, the sensor signal being used in the determination of the potential threat. This periodic enabling, or strobing, of the vehicle sensor may conserve vehicle battery power. Then step 802 determines if there is a coupling to a second vehicle. If not, the process of FIG. 3 is exited to at step 810. If coupled to another vehicle, step 804 periodically enables strobing of the sensor at a second rate less than the first rate. Building on a prior example a sensor of a system having a single vehicle may be periodically strobed at a first rate of once per second. When coupled to a second vehicle, the periodic strobing may be reduced to once every two seconds thereby further conserving battery power. The sensor of the second vehicle may also be periodically strobed at the second rate of once every two seconds but phased one second after the sensor of the first vehicle, thereby making maintaining the combined strobing of both vehicles at once per second while enhancing power conservation in both vehicles. Then step 802 determines if a vehicle sensor information signal indicates a presence of a potential vicinity threat, and if so step 808 periodically enables the vehicle sensor at a third rate greater than the second rate thereby providing more sensor information for the determination of the potential threat. The third periodic rate may be any value greater than the second periodic rate, and in this example may be a rate greater than once every two seconds, for example: once every one and a half seconds, once every second, once every half second, or even continuously on. The process of FIG. 3 is then exited to at step 810

What is shown is a system and method for monitoring activities of properties such as buildings using vehicles such as parked cars located outside of the properties. The parked cars are used for monitoring of the properties. Multiple sensors already installed in the parked cars are connected to an existing security system. The parked cars may communicate with each other to enhance the monitoring performance. While vehicles such as cars may include self-powered and self-contained security systems, they may also be deployed in such a way as to enhance the surveillance of local area security systems. Incorporating a parked vehicle to a security system may also avoid the expense of purchasing and installing the supplemental sensors already available on a vehicle. This potential advantage may become more apparent when a desire for enhanced sensing is temporary; parking a vehicle in an appropriate location may quickly and economically provide the enhanced sensing.

Vehicle equipment purposed to implement vehicle functions may be repurposed when coupled to a local area security system. For example, a computer system purposed to implement navigation, advanced driver assistance services and other vehicle functions may be repurposed to implement the security network, with home security systems, image recognition and other potential threat determinations. Cameras used to implement vehicle functions such as lane detection and traffic recording may be repurposed to implement vicinity recording and human detection. Ultrasonic sensors used implement vehicle functions such as collision detection may be repurposed for activity detection. Rain sensors used to implement vehicle functions of windshield wiper operations may be repurposed facilitate a rain mode processing for image recognition. Light sensors used to implement vehicle functions of headlight operation may be repurposed to facilitate night mode processing for image recognition.

A local area security system may have local sensors for motion detection, and open window and open door detection. When a vehicle is incorporated into the local area security system, the additional vehicle equipment is available for repurposing. For example a vehicle computer system may be repurposed to provide additional image recognition resources, vehicle cameras may provide additional recording and human detection, and other vehicle sensors may provide augmented information.

Furthermore, parked cars may share resources and facilities by communicating with each other. An entire security system may be formed by a network of cars, a local area security system covering a fixed vicinity may not be necessary. The network of cars may form a security system covering a parking lot, a block, a street or even a village. In this example, the cars form a communication, signal processing, and sensing network. It is not necessary for all cars to have similar sensors or resources. The heterogeneous resources of each vehicle may be incorporated into a multi-vehicle security system. Efficient load balancing may be used to enable fair usage of the resources and equipment of each vehicle. If an intruder is detected by one vehicle, an alarm may be broadcast to the other vehicles in the network. If one of the vehicles is coupled to vehicle having a cellular modem, then an alarm may be delivered to an appropriate security agency through the cellular modem, even though the vehicle with the cellular modem was not the vehicle victimized by the intruder.

A potential advantage of this description is a provision of security against security system neutralization attempts because a portion of the security system may be hidden in one or more vehicles. Thus there may be no one master unit or control box, which if neutralized would deactivate the security system.

At least a portion of the description herein may be implemented in a software application installed in a vehicle. The application may be and aftermarket software package installed in an existing car by an owner or aftermarket service thereby adding additional utility to existing vehicles. In another example the application may be an original equipment application installed in a vehicle at time of manufacture. Vehicles equipped with the functionality herein may be owned by various agencies, such as rental car companies, which may deliver vehicles to locations where additional security is required for the duration that the additional security is needed.

Also described herein is a system and method for monitoring activities of properties by using parked cars outside properties such as buildings such as houses, office structures or retail establishments. In addition to using dedicated equipment for security, described herein is a method to utilizing existing in-car resources with a different operation mode. The description includes a method for communicating information obtained from the sensors in the parked car to neighboring other parked cars or existing home security system. Further, described herein is a method for sharing different sensors or facilities in the parked cars by using the framework built on top of connected parked cars. Further described is a method for reconstructing any events recorded individually around the parked cars in the order of occurrence by identifying, merging, and/or classifying relevant information in the background utilizing distributed computing and memory resources. Such resources may be included in the vehicles, the security systems and the cloud. Sensors in the parked cars for monitoring any security-related events occurring around the local area computer system (possibly in conjunction with the existing security system) to augment security system with resources (e.g. sensors) in the parked cars. Moreover, when combined with the cloud infrastructure, the system provides additional features such as tracking of street-level events or global resource managements. Further, the vehicle may form another "zone" to secure, and sensors equipped in the vehicle may be used for monitoring suspicious activities in and around the vehicle. The sensors in the parked car are exploited or redeployed to monitor the vicinity, which means the parked vehicles may serve as another security measure. Existing resources equipped in the vehicle are repurposed for monitoring the vicinity, which provides a potential advantage of not requiring external monitoring sensors in the local area security system. The communication between cars and existing security system may be based upon a peer-to-peer network which may be robust against frequent joining/leaving of vehicles. Moreover, the dynamic nature of cooperative parked cars may be leveraged by incorporating load balance of resource-usage between parked cars.

As will be appreciated by one skilled in the art, aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer programming product for controlling an operation of a vehicle having a computer system for implementing a function of the vehicle when the vehicle is located beyond a vicinity of a local area security system, the function based upon a sensor signal from a vehicle sensor sensing a condition exterior to the vehicle, a method for controlling the operation comprising:
   a tangible non-transitory computer-readable storage medium; and
   computer program instructions for
      determining a vehicle location to be within the vicinity of the local area security system, and
      communicating a sensor information signal based upon the sensor signal to the local area security system
      enabling the vehicle sensor to consume power from a battery included within the vehicle to produce the sensor signal;
      coupling to a second vehicle located within the vicinity of the local area security system, the second vehicle having a second vehicle sensor providing a second sensor information signal to the local area security system; and
      conserving battery power by disabling the vehicle sensor to consume power from the battery based upon the sensor information signal being determined to be redundant to the second sensor information signal.

2. The computer program product according to claim 1 wherein the computer system determines that the sensor signal is indicative of an absence of a potential threat to the vehicle and the communicating communicates the sensor information signal based upon the determined absence of the potential threat to the vehicle.

3. The computer program product according to claim 2 wherein the sensor signal is indicative of a presence of a potential threat to the vehicle and the method further comprises
   including the presence of the potential threat to the vehicle within the sensor information signal.

4. The computer program product according to claim 1 wherein the sensor signal is indicative of a presence of a potential threat to the vehicle and the method further comprises:
   determining a presence of a potential threat within the vicinity of the local area security system based upon the sensor signal, and
   including the determined presence of the potential threat within the sensor information signal.

5. The computer program product according to claim 1 further comprising:
   periodically enabling the vehicle sensor to consume power from a battery included within the vehicle at a first periodic rate for producing the sensor signal;
   coupling to a second vehicle located within the vicinity of the local area security system, the second vehicle having a second vehicle sensor for providing a second sensor information signal to the local area security system; and
   periodically enabling the vehicle sensor to consume power from the battery at a second periodic rate less than the first periodic rate for producing the sensor signal, the second periodic rate based upon the coupling, wherein power consumption from the battery is reduced at the second periodic rate relative to the first periodic rate.

6. The computer program product according to claim 5 further comprising
   periodically enabling the vehicle sensor to consume power from the battery at a third periodic rate greater than the second periodic rate based upon the second sensor information signal indicating a detection of a potential threat within the vicinity of the local area security system.

7. The computer program product according to claim 1 wherein the vehicle includes another sensor for affirmatively identifying a presence of a non-threat within a vicinity of the vehicle, the method further comprising:

determining a presence of a potential threat within the vicinity of the local area security system based upon the sensor signal;

affirmatively identifying the presence of the non-threat within the vicinity of the vehicle based upon the other sensor; and including the identified presence of the non-threat within the sensor information signal.

8. The computer program product according to claim 1 method further comprising:

determining a presence of a potential threat within the vicinity of the local area security system based upon the sensor signal;

coupling to a second vehicle located within the vicinity of the local area security system, the second vehicle having a second vehicle sensor for affirmatively identifying a presence of a non-threat within a vicinity of the local area security system based upon the second sensor; and excluding the determined presence of the potential threat from the sensor information signal based upon the second vehicle identifying the presence of the non-threat.

9. The computer program product according to claim 1 further comprising:

coupling to a second vehicle located within the vicinity of the local area security system, the second vehicle having a second vehicle sensor providing second sensor information to the vehicle;

determining a presence of a potential threat within the vicinity of the local area security system based upon the sensor signal and the second sensor information; and including the determined presence of the potential threat within the sensor information signal.

10. The computer program product according to claim 1 wherein the vehicle sensor includes at least one of an acoustic receiver, an acoustic transceiver, an infrared sensor, an infrared transceiver, a temperature sensor, a humidity sensor, a precipitation detector, a smoke sensor, a magnetometer, an accelerometer, a gyroscopic sensor, a proximity sensor, a radio receiver, a radio transceiver, RADAR, LiDAR, LaDAR, an ambient light detector, and a video camera.

11. The computer program product according to claim 1 further comprising including a live signal representation of the sensor signal within the sensor information signal.

12. The computer program product according to claim 11 further comprising:

determining a presence of a potential threat within the vicinity of the local area security system based upon the sensor signal, and including the determined presence of the potential threat within the sensor information signal.

13. The computer program product according to claim 1 further comprising:

determining a failure in the local area security system; and broadcasting a defect signal based upon the failure.

14. The computer program product according to claim 1 further comprising:

wirelessly coupling to a second vehicle located within the vicinity of the local area security system, the second vehicle having a second vehicle sensor providing a second sensor information signal to the local area security system; and communicating the sensor information to the second vehicle such that the second vehicle communicates a signal based upon the sensor information signal to the local area security system.

15. The computer program product according to claim 14 wherein the vicinity of the local area security system is enlarged based upon the second vehicle wirelessly coupling with the vehicle.

* * * * *